(12) United States Patent
Fainstein et al.

(10) Patent No.: US 11,960,584 B2
(45) Date of Patent: Apr. 16, 2024

(54) FRAUD DETECTION IN VOICE BIOMETRIC SYSTEMS THROUGH VOICE PRINT CLUSTERING

(71) Applicant: NICE LTD., Ra'anana (IL)

(72) Inventors: Michael Fainstein, Zoran (IL); Roman Frenkel, Ashdod (IL)

(73) Assignee: NICE LTD., Ra'anana (IL)

( * ) Notice: Subject to any disclaimer, the term of this patent is extended or adjusted under 35 U.S.C. 154(b) by 372 days.

(21) Appl. No.: 17/464,817

(22) Filed: Sep. 2, 2021

(65) Prior Publication Data
US 2023/0061617 A1 Mar. 2, 2023

(51) Int. Cl.
*G06F 21/32* (2013.01)
*G10L 17/12* (2013.01)
*G10L 25/51* (2013.01)

(52) U.S. Cl.
CPC ............ *G06F 21/32* (2013.01); *G10L 17/12* (2013.01); *G10L 25/51* (2013.01)

(58) Field of Classification Search
CPC ......... G06F 21/32; G10L 17/12; G10L 25/51; G10L 17/06
See application file for complete search history.

(56) References Cited

U.S. PATENT DOCUMENTS

| | | | | |
|---|---|---|---|---|
| 2009/0119106 A1* | 5/2009 | Rajakumar | ............ | G06F 21/32 704/E17.001 |
| 2012/0072453 A1* | 3/2012 | Guerra | ............ | H04L 9/32 707/E17.014 |
| 2012/0254243 A1* | 10/2012 | Zeppenfeld | ............ | G06Q 20/4016 707/778 |
| 2014/0136194 A1* | 5/2014 | Warford | ............ | G10L 25/51 704/233 |
| 2014/0214676 A1* | 7/2014 | Bukai | ............ | G10L 17/24 705/44 |
| 2016/0365095 A1* | 12/2016 | Lousky | ............ | G10L 17/04 |
| 2019/0020757 A1* | 1/2019 | Rao | ............ | H04M 3/5175 |
| 2019/0362057 A1* | 11/2019 | Keret | ............ | G10L 17/02 |

OTHER PUBLICATIONS

Anwer et al., "Fraud-sentient security architecture for improved telephone banking experience", Oct. 2016, IEEE 7th Annual Information Technology, Electronics and Mobile Communication Conference, pp. 1-7 (Year: 2016).*

\* cited by examiner

*Primary Examiner* — Kenneth W Chang
(74) *Attorney, Agent, or Firm* — Haynes and Boone, LLP (57) ABSTRACT

A system is provided for fraud prevention upscaling with a fraudster voice print watchlist. The system includes a processor and a computer readable medium operably coupled thereto, to perform fraud prevention operations which include receiving a first voice print of a user during a voice authentication request, accessing the fraudster voice print watchlist comprising voice print representatives for a plurality of voice print clusters each having one or more of a plurality of voice prints identified as fraudulent for a voice biometric system, determining that one or more of the voice print representatives in the fraudster voice print watchlist meets or exceeds a first biometric threshold for risk detection of the first voice print during the fraud prevention operations, and determining whether the first voice print matches a first one of the plurality of voice print clusters.

18 Claims, 6 Drawing Sheets

FRAUD DETECTION IN VOICE BIOMETRIC SYSTEMS THROUGH VOICE PRINT CLUSTERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to biometric analysis and voice print comparison during fraud detection, and more specifically to a system and method for efficient voice biometric authentication and fraud detection through voice print clustering when progressively scaling a voice biometric system with fraudster voice prints.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

When customers interact with different computing systems of a service provider, such as sales or purchasing systems, customer relationship management (CRM) systems, service or help systems, information systems, and the like, the customers may engage in voice communications, require voice authentication, and request sensitive information. These customers may correspond to individual users and/or users of an organization that may want to gain access to certain services and/or data, for example, computing service the users have enrolled in and/or purchased, data the user has stored or generated, and/or previous activity the user has performed with the service provider's systems. The service provider may authenticate users through voice biometrics for audio and/or audiovisual calls and communications. Further, the service provider may want to continue monitoring users' audio, and corresponding voice prints, in real-time or near real-time to detect fraudsters and prevent abuse and other malicious conduct. Biometric authentication and analysis may provide more trusted authentication and fraud prevention by performing authentication that should be particular to a specific user and difficult to imitate. Voice biometrics may be accomplished by monitoring users' voice communications and voice prints to determine if the users match past detected fraudsters that committed computing attacks or abuse. For example, fraudsters may have the same or similar vocal signatures in their voice prints. During voice communications, such as communications over a publicly switched telephone network (PSTN), cellular network, voice over IP (VoIP), voice over LTE (VoLTE), and/or voice communications over data networks, biometric authentication and fraud detection may be done using voice samples from audio and voice prints generated from those voice samples. When fraudsters are detected with voice biometric authentication and fraud prevention systems, a recording of audio from a user, such as a phrase, name, identifier, voice sample during speech, or the like, may be stored in a database system of the service provider. The audio may be converted to voice prints and used during voice authentication and fraud detection by matching incoming voice prints during voice communication sessions to the previously detected and stored voice prints of fraudsters.

Often fraudsters may call a service provider, call center, and/or voice chat service to try to obtain customer information for customers of the service provider. Agents are usually customer-oriented and therefore may provide this sensitive information when attempting to provide aid and customer care. This information then allows fraudsters to perform account takeovers, steal identities, transfer money/items, and perform additional malicious acts. In order to reduce and/or eliminate malicious actions by fraudsters during voice communication sessions, real-time fraud prevention (RTFP) may be performed, which seeks to compare, in real-time or near real-time, incoming voice prints with existing voice prints of fraudsters in a database of the service provider for known fraudsters. These fraudster voice prints are stored in a group called a fraudster voice print watchlist. The generation of a voice print and storing for a long period of time requires a high storage capacity, which may then cause a few seconds or more of latency when processing high loads for voice print analysis and comparison.

Conventionally, the RTFP operations and algorithms compare a voice print in an incoming call with every existing fraudster voice print in a watchlist. Thus, if there are one hundred fraudster voice prints in the watchlist, one hundred individual analysis and comparisons are performed. This may work with small watchlists, but as the number of existing voice prints in the watchlist increases, performance becomes noticeably degraded, and the analysis may not be performed in real-time or near real-time to properly catch fraudsters and prevent fraud. Thus, the increasing size of fraudster voice prints in the watchlist leads to significant time losses and risk for computing systems. It therefore is desirable to retain the benefits of fraud detection using voice biometric analysis by building a mechanism to compare incoming voice prints with fraudster voice prints in a faster and more efficient manner, while minimizing fraud and risk.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION OF PREFERRED EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a fraud detection system, such as a system for real-time fraud prevention (RTFP) for biometric analysis and/or authentication using voice prints, methods, data structures, and systems are provided herein to progressively scale using fraudster voice print clusters for one-to-few voice print comparisons. A service provider, such as a sale and purchasing system, help or assistance system, CRM system, customer service system, business management system, organizational management system, or other networked service provider, may provide audio and/or audiovisual communications. This may include phone calls, video conferencing, audio/video streaming, communication services, and the like. For example, different internal and/or external users of a service provider may interact over end-to-end voice communications, such as when engaging with and calling a customer service and/or CRM system. During voice communications, a biometric authentication system may provide biometric authentication and fraud prevention through analysis of voice prints. This may include comparison of one or more stored voice prints of one or more fraudsters to a voice print determined and/or generated during the voice communications.

However, in conventional systems, many fraudster voice prints may be stored for long time periods in high capacity storage. Voice print comparison is also performed on a one-to-many basis, where a voice print from incoming audio is compared to all of the stored fraudster voice prints in a fraudster voice print watchlist. This may not be optimized in high load systems and real-time performance for fraud detection tends to become degraded and slowed in these high load systems as the load increases and the watchlist increases in size. Further, with large fraudster voice print watchlists, fraudster voice prints may be duplicated instead of enriched when additional fraudster voice prints are detected, which may not be as accurate for fraud prevention.

In order to reduce the one-to-many voice print comparison system to a one-to-few voice print comparison system, progressive scaling of the voice print comparison system may be employed where clustering of voice prints may be used to reduce the number of individual voice print comparisons that must be made. In this regard, the progressive scaling of the voice print comparison system for biometric authentication and fraud detection and prevention may utilize three or more different stages for voice print comparison and clustering, where different comparisons may be utilized at each stage to boost efficiency in real-time. For example, in a first phase or stage, a service provider's biometric authentication and fraud detection system that uses voice print comparisons may initially have a small fraudster voice print watchlist, where the number of fraudster voice prints may be at or under a certain pre-selected threshold, such as one hundred voice prints. When an incoming audio or audiovisual call is received, the audio from the call may be processed (e.g., by processing the digital signals of the audio) so that a voice print may be determined. The voice print may correspond to a vector or other mathematical representation that allows for comparison to other vectors or mathematical representations from known fraudsters' voice prints (e.g., generated from audio of fraudsters).

This may be done through the voice biometric system of the service provider that performs audio conversion to voice prints and voice print comparison through vector analysis. When comparing vectors, a similarity score and/or similarity threshold score may be used to determine if a voice print from incoming audio sufficiently compares with and/or matches one or more fraudster voice prints. For example, a highest similarity score may be used and/or a 90% similarity score threshold (or other pre-selected score threshold based on percent similarity) may be required when matching voice prints to fraudster voice prints. Thus, in some embodiments, a highest scored comparison between voice prints (and their corresponding vectors) may be used to identify potential fraudster; however, a threshold may further be required to avoid false positives when a highest scored match may only be 25% and thus unlikely to be similar.

At this stage, where the fraudster voice prints are at or below the first threshold, the system may be considered sufficiently real-time for RTFP under various processing loads. Thus, real-time or near real-time voice print comparisons may be made between a voice print from incoming audio and the fraudster voice prints in the watchlist. This allows for real-time or near real-time fraud detection outputs when fraudster voice prints are matched to and identified in incoming audio. An employee of the service provider, such as a call center agent, may receive sufficiently real-time fraud detection alerts. However, as more fraudster voice prints are detected, obtained, and/or registered as fraudulent, the fraudster voice print watchlist may continue to rise in count. When meeting or exceeding the first threshold (e.g., one hundred fraudster voice prints), a second stage or phase may be employed. Initially, when reaching this second stage, the fraudster voice prints in the watchlist may be clustered using a clustering algorithm and/or technique. For example, k-means clustering may be utilized for clustering of voice print vectors (e.g., by the dimensionality of the vectors and/or vector representation in graph-based or N-dimensional space for the vectors). However, other clustering algorithms may be used including mean-shift clustering, K centroids, K Medoids, DBSCAN, and the like.

Once clustering has been performed to identify the fraudster voice print clusters having one or more of the fraudster voice prints from the watchlist, the second stage may be implemented to perform one-to-many voice print comparison of the voice print received from the incoming audio and each fraudster voice print in the watchlist. However, the second stage may further compare the received voice print to a representative of each cluster of fraudster voice prints. For example, by taking an average or other representation of all of the fraudster voice prints in a fraudster voice print cluster, a representative fraudster voice print for that cluster may be obtained. This allows for the received voice print to be more efficiently compared to each fraudster voice print cluster. When comparing to the fraudster voice print clusters, a learning stage and configuration may be implemented to better cluster and/or re-cluster the fraudster voice prints. The received voice print may be compared to each fraudster voice print to determine one or more fraudster voice prints that sufficiently match or compare to the received voice print, such as being highest scored in a group or cluster of voice prints and/or meeting or exceeding a threshold similarity score when compared. Further, one or more fraudster voice print clusters may be identified as matching or comparing to the received voice print (e.g., over a threshold similarity score) using the representative voice print vectors for the fraudster voice print cluster. If no sufficiently high scores are identified, then the received voice print may be considered non-fraudulent and monitoring may be continued.

If matching occurs based on highest score and/or threshold score, then fraud may be identified or predicted. When identifying one or more individual fraudster voice print(s) and clusters of fraudster voice print(s) during the learning phase of the second stage, it may be determined if certain fraudster voice prints are not properly clustered. For example, it may be expected that for a highest scored or matching cluster, the cluster further contains a highest scored or matching fraudster voice print. Thus, if a representative vector for a fraudster voice print cluster is compared to and sufficiently matches a received voice print from incoming audio, but the one or more matched fraudster voice prints that meet or exceed a similarity score threshold are not found in that cluster, those fraudster voice prints may be moved between cluster and/or clustering may reoccur to better cluster the fraudster voice prints. Further, an N highest number of clustered may be matched and the highest matched representative voice print vectors for an expanded number of clusters may be used to further tune and adjust the clusters during the second phase. Other mechanisms, such as those explained herein, may also be used.

Thus, the second stage may perform one-to-many and one-to-few voice print comparisons in the voice biometric and fraud detection system by comparing voice prints, and corresponding vectors, and identifying highest scored matches meeting or exceeding a threshold score. This allows for the adjustments of the clusters during the learning and configuration phase of the second stage. Once the number of fraudster voice prints in the fraudster voice print watchlist meet or exceed the second, higher, pre-selected threshold number for the watchlist, the biometric voice authentication and fraud detection system may implement a third stage. During the third stage, the one-to-few voice print comparison occurs between a received voice print from incoming audio during a call or other voice communication session and the representative voice prints (and corresponding representative vectors) for the voice print clusters. Thus, fewer voice print comparisons occur than would be required with all the fraudster voice prints in the watchlist. Once one or more highest matched clusters are identified, comparison occurs between the received voice print and each fraudster voice print in the identified cluster(s). If there is a sufficiently highly scored match or comparison to a fraudster voice print, the received voice print may be flagged as potentially fraudulent, and an alert may be similarly output to an agent for review, additional action, requested authentications, and/or termination of the voice communications.

Thus, the comparisons may result in a score, value, or match analysis using a voice biometric comparison system. This score may be based on a calculated distance between vectors for the voice prints, such as a similarity score between the voice prints. The biometric authentication system may implement a threshold to the score with both the individual fraudster voice prints and the clusters of fraudster voice prints, which may be required to be met or exceeded in order to identify received voice prints as potentially fraudulent. However, the number of highest scored and/or threshold may be adjusted depending on the system, voice prints, clusters of the voice prints, and the like. It should be understood that, as processing technology, equipment, and other changes increase efficiency, the pre-selected first and second thresholds may be adjusted when desired.

The embodiments described herein provide methods, computer program products, and computer database systems for progressively scaling fraudster voice print systems. The service provider system associated with or incorporating the voice print fraud detection system may therefore process, encode, and compare voice prints during voice communications, thereby reducing preparation and processing times during fraud detection. For example, the online system may provide a biometric authentication and fraud detection system that provides voice fraud detection in real-time and/or with reduced latency, thereby resulting in faster fraud detection and notification. Once a voice print clustering and learning stage is configured, the biometric authentication and fraud detection system may provide voice print comparison and fraud detection in a faster and more convenient manner.

According to some embodiments, in a service provider computing system accessible by a plurality of separate and distinct organizations, a voice biometric system is provided for identifying and designating particular voice prints into distinct clusters and comparing to individual voice prints in those clusters, thereby optimizing voice biometrics in fraud detection, reducing data processing resources and costs, and providing faster voice biometric processing with better accuracy.

Example Environment

Figure 1:
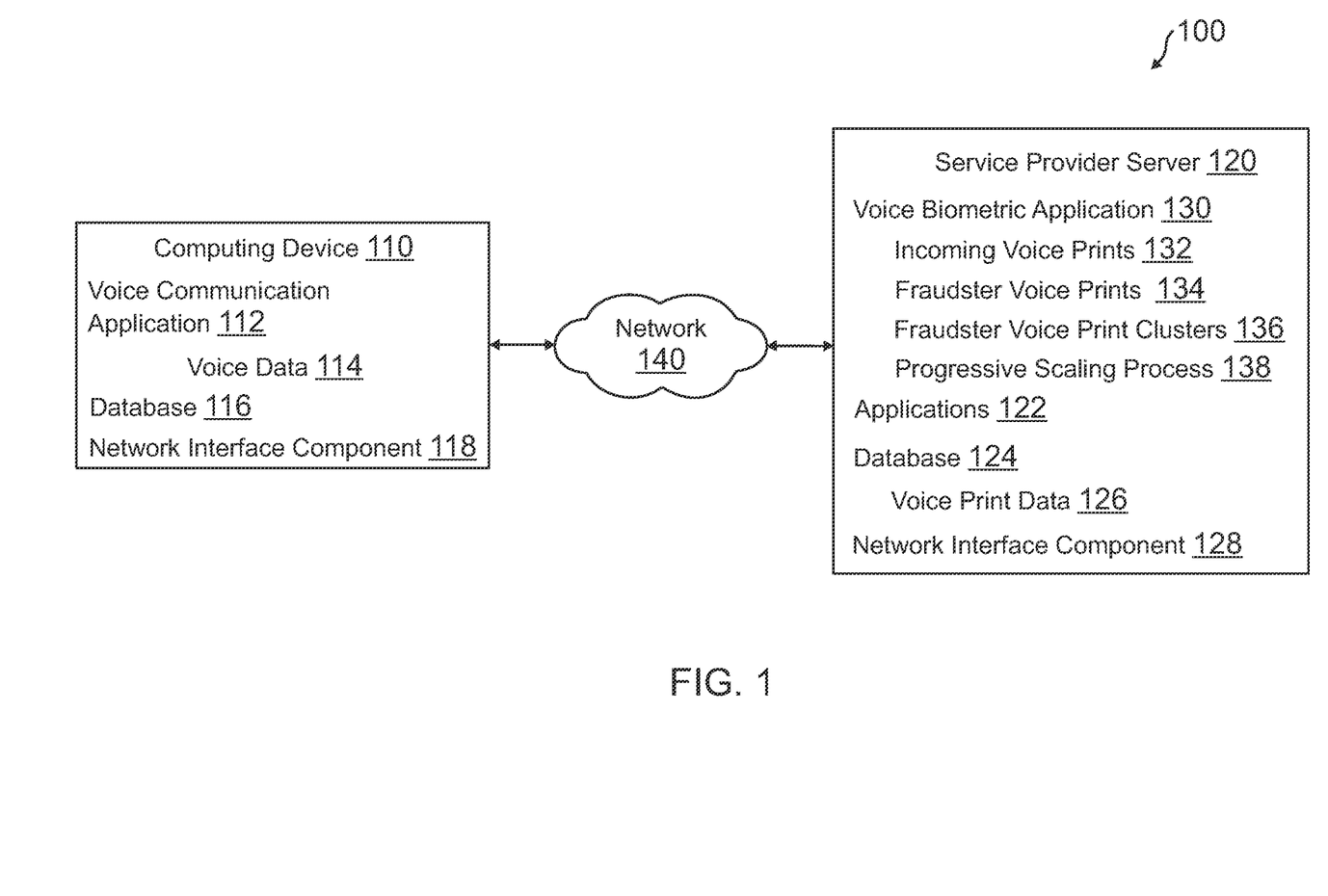
FIG. 1 is a simplified block diagram of a networked environment suitable for implementing the processes described herein according to an embodiment.

The system and methods of the present disclosure can include, incorporate, or operate in conjunction with or in the environment of a voice biometric service, system, database, and portal, which may include web and device applications used for voice biometric processing for authentication and/or fraud detection and prevention services during voice communications. FIG. 1 is a block diagram of a networked environment suitable for implementing the processes described herein according to an embodiment. As shown, an environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include computing device 110 and a service provider server 120 that interact to provide automated comparison of voice prints during voice communications for voice biometric authentication and fraud detection. In other embodiments, environment 100 may not have all of the components listed and/or may have other elements instead of, or in addition to, those listed above. In some embodiments, the environment 100 is an environment in which progressive scaling from a one-to-many to a one-to-few comparison of voice prints is provided. A computing device 110 may be any machine or system that is used by a user to perform voice communications, authentication, and/or provide audio analyzed during fraud detection. Computing device 110 can be a handheld computing device, a mobile phone, a laptop computer, a notepad computer, a work station, and/or a network of computing devices. As illustrated in FIG. 1, computing device 110 might interact via a network 140 with service provider server 120, which performs the voice authentication.

Computing device 110 may be utilized to access computing services, resources, and/or data via voice communication application 112. Computing device 110 may be utilized by a customer, client, or another user that interacts with service provider server 120 for voice communications. A user's unique ID may be provided during a login or authentication process on computing device 110, which may require audio signals converted to a voice print for voice authentication that may be analyzed for fraud using fraudster voice prints. The user may further provide additional audio signals during the voice communication, which may be used to further convert to and generate voice prints of the user that are compared to the fraudster voice prints in a fraudster voice print watchlist. Computing device 110 may access computing resources provided by service provider server 120 and therefore fraud detection may be required to prevent malicious users and entities from fraudulently using such resources and other computing devices, as well as accessing sensitive or secure data. The user may provide audio signals via voice communication application 112 in the form of voice data 114 that is convertible to voice prints. Thus, computing device 110 may correspond to a device, server, or the like that interfaces with service provider server 120 to utilize the services, applications, data storage, and the like of the corresponding computing environment. Service provider server 120 may receive the unique ID for the customer and provide access to computing resources via applications 122, which may include applications provided by a CRM system using voice communications. In some embodiments, voice communication application 112 or other software applications residing locally on computing device 110 may access, display, output, and/or utilize applications 122 provided by service provider server 120.

Service provider server 120 may be utilized by different customers, clients, organizations, companies, and/or other users to access and utilize computing resources, which may utilize voice biometrics for authentication and fraud detection discussed herein. Service provider server 120 may provide computing services via applications 122 and may utilize a voice biometric application 130 to provide voice authentication and fraud detection through voice biometrics. Applications 122 may include applications utilized by users, which provide services, data processing, storage, and the like to user via computing device 110, such as those involved in sale and purchasing, help or assistance services, call centers for customer business and/or inquiries, CRM, business management, organizational management, and the like. Voice biometric application 130 may include a progressive scaling process 138 to scale through stages of voice biometric processing, including scaling from a one-to-many approach to voice print comparison to a one-to-few approach that performs fewer individual comparisons. This may be performed by comparing incoming voice prints 132 from incoming audio data, such as voice data 114, to fraudster voice prints 134 and/or fraudster voice print clusters 136. Applications 122 may also include other applications associated with user interface display, data processing or output, data retrieval and/or storage, user interface display and output, server security, and other additional applications for cloud and/or on-premises computing architectures.

Service provider server 120 may provide services for voice authentication and fraud detection through voice biometric application 130. For example, voice data 114 may be provided by computing device 110 during voice communications. Voice biometric application 130 may utilize progressive scaling process 138 during voice communications to determine whether to compare incoming voice prints 132 to fraudster voice prints 134 in a first stage, to generate and configure fraudster voice print clusters while comparing incoming voice prints 132 to fraudster voice prints 134 and representatives of fraudster voice print clusters 136 in a second stage, or to compare incoming voice prints 132 to the representatives of fraudster voice print clusters 136 in a third stage. Determination of which stage to use with progressive scaling process 138 may be based on a pre-selected number of fraudster voice prints 134 that are in a fraudster voice print watchlist. For example, when below or at a first, lower, threshold, the first stage may be used, when at or above the first threshold but below or at a second, higher threshold, the second stage may be used, and when at or above the second threshold, the third stage may be used.

Voice data 114 from voice communication application 112 on computing device 110 may be used when logging in to an account or other authentication system for access and use of computing services provided through applications 122. Voice data 114 may also be provided during voice communications, which may not require a prior authentication or may occur after the authentication. Voice biometric application 130 may then access fraudster voice prints 134 and/or fraudster voice print clusters 136, which may be stored as voice print data 126 from a database 124, to perform voice biometric authentication and/or fraud detection of the user using computing device 110. Fraudster voice prints 134 and/or fraudster voice print clusters 136 may correspond to stored, vectorized, encoded, and/or compressed voice prints for voice biometric analysis and comparison. Thereafter, voice biometric application 130 may provide an authentication and/or fraud detection result to computing device 110 and/or an agent device monitoring and/or engaging in voice communications, which may approve or decline authentication, provide a fraud alert, and/or otherwise engage in an action to minimize or avoid fraud, account takeover, and other malicious actions.

In some embodiments, the users of computing device 110 may differ in their respective capacities, and the capacity of a particular computing device 110 might be determined by applications, permissions, and profiles for the current user. Thus, different users will have different capabilities and perform different authentication events with regard to accessing and authenticating via voice communication application 112. This is not mandatory, however. and it is understood that computing device 110 may generally have certain capacities that are universal to users, entities, or other clients (thereby not specific to operations submitted for processing by service provider server 120).

Computing device 110 may execute a web-based client that accesses a web-based application for service provider server 120, or may utilize a rich client, such as a dedicated resident application, to access service provider server 120. Computing device 110 may utilize one or more application programming interfaces (APIs) to access and interface with service provider server 120 to engage in voice communications. Thus, voice communication application 112 can be used to access data and applications hosted by service provider server 120 and to perform searches on stored data, for example, through providing an audio and/or audiovisual interface to a user (e.g., a GUI output) or via an API of voice communication application 112. Interfacing with service provider server 120 may be provided through voice communication application 112 and may include data stored to a database 116, such as a device fingerprint, device ID, or other ID that may be provided during voice communications. Service provider server 120 may process and provide data through applications 122. Database 124 of service provider server 120 may store voice print data 126 associated with fraudster voice prints 134 and/or fraudster voice print clusters, such as encoded and/or compressed voice prints.

Computing device 110 might communicate with service provider server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between computing device 110 and service provider server 120 may occur over network 140 using a network interface component 118 of computing device 110 and a network interface component 128 of service provider server 120. In an example where HTTP/HTTPS is used, computing device 110 might include an HTTP/HTTPS client commonly referred to as a "browser" for sending and receiving HTTP//HTTPS messages to and from an HTTP//HTTPS server, such as service provider server 120 via network interface component 118. Similarly, service provider server 120 may host an online platform accessible over network 140 that communicates information to and receives information from computing device 110 via network interface component 128. Such an HTTP/HTTPS server might be implemented as the sole network interface between computing device 110 and service provider server 120, but other techniques might be used as well or instead. In some implementations, the interface between computing device 110 and service provider server 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Computing device 110 may utilize network 140 to communicate with service provider server 120, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, service provider server 120 is configured to provide webpages, forms, applications, data, and media content to computing device 110 and/or to receive data from computing device 110. In some embodiments, service provider server 120 may be provided or implemented in a server environment and/or cloud environment, which may be accessible through one or more APIs with or without a corresponding graphical user interface (GUI) output. Service provider server 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline back-ups or other redundancies, etc., and might include a distributed database or storage network and associated processing intelligence.

Several elements in the system shown in FIG. 1 include embodiments that are explained briefly here. For example, computing device 110 could include a desktop personal computer, workstation, laptop, notepad computer, PDA, cell phone, or any wireless access protocol (WAP) enabled device or any other computing device capable of interfacing directly or indirectly to the Internet or other network connection. Computing device 110 may also be a server or other online processing entity that provides functionalities and processing to other client devices or programs, such as online processing entities that provide services to a plurality of disparate clients.

Computing device 110 typically runs an HTTP/HTTPS client, e.g., a browsing program, such as Microsoft Internet Explorer ° or Edge ° browser, Google Chrome ° browser, Mozilla Firefox ° browser, or a WAP-enabled browser in the case of a cell phone, notepad computer, PDA or other wireless device, or the like. According to one embodiment, computing device 110 and all of its components are configurable using applications, such as a browser, including computer code run using a central processing unit such as an Intel Pentium® processor or the like. However, computing device 110 may instead correspond to a server configured to communicate with one or more client programs or devices, similar to a server corresponding to service provider server 120 that provides one or more APIs for interaction with computing device 110.

Thus, computing device 110 and/or service provider server 120 and all of their components might be operator configurable using application(s) including computer code to run using a central processing unit, which may include an Intel Pentium® processor or the like, and/or multiple processor units. A server for computing device 110 and/or service provider server 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring computing device 110 and/or service provider server 120 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 and/or database 124, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun MicroSystems, Inc.).

Voice Print Clustering and Comparison System

Figure 2:
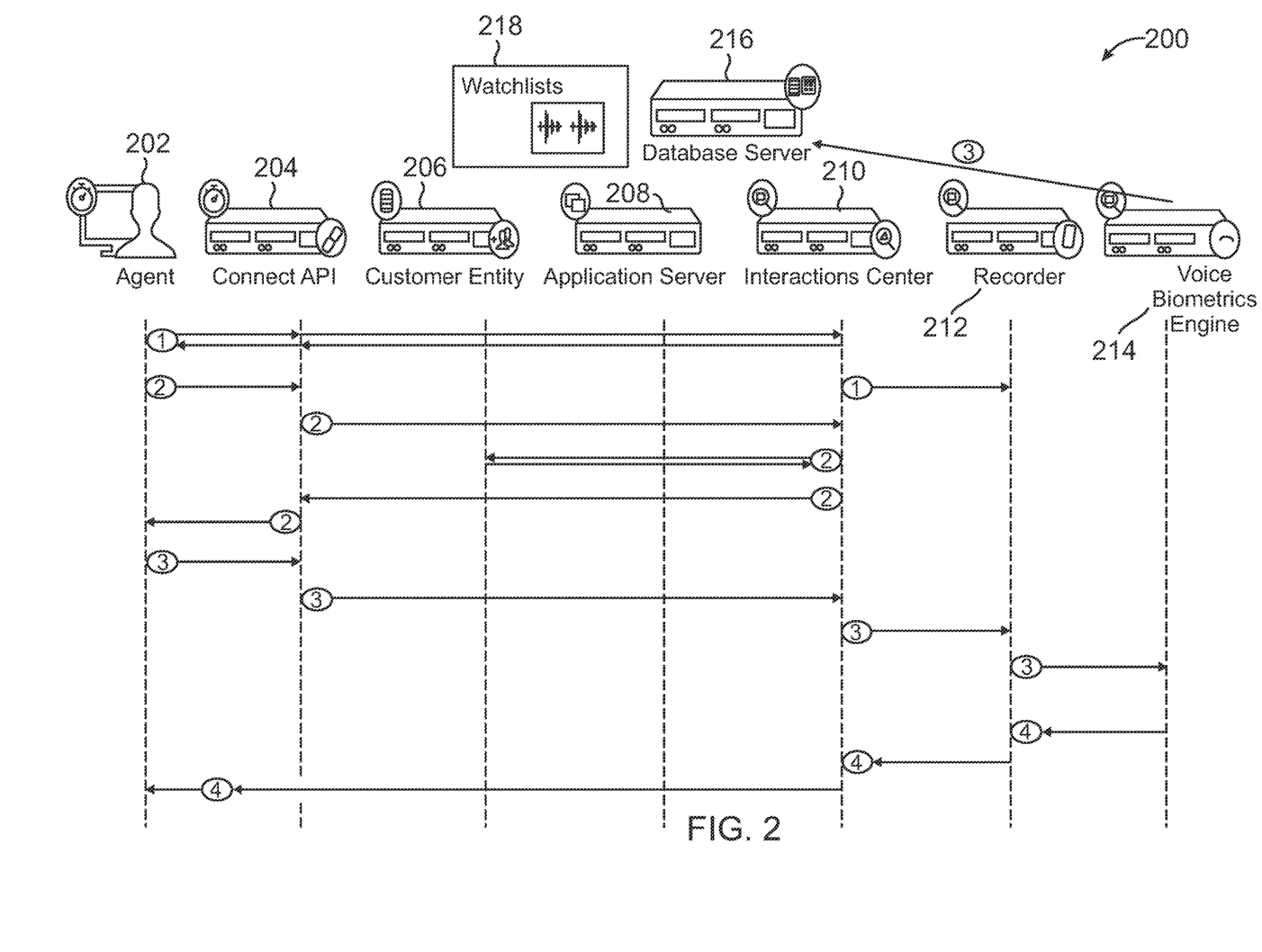
FIG. 2 is a simplified diagram of exemplary interactions with a service provider's systems that perform fraud detection through voice biometric analysis and authentication according to some embodiments.

FIG. 2 is a simplified diagram of exemplary interactions with a service provider's systems that perform fraud detection through voice biometric analysis and authentication according to some embodiments. Diagram 200 of FIG. 2 includes operations performed between an agent 202 and the components of a service provider's systems and servers, such as those voice communication exchanges, API calls, and data retrieval occurring by agent 202 with service provider server 120 discussed in reference to environment 100 of FIG. 1. In this regard, diagram 200 displays a real-time fraud protection (RTFP) flow between the components of the service provider's system.

In diagram 200, initially a customer or other end user may contact agent 202 through a call center or other audio or audiovisual communication channel with the service provider (e.g., a CRM platform and communication channel). At an interaction 1, the incoming call may reach the call center and a new communication session and interactions may start with the service provider's system. The contact channel may communicate with an authentication system, such as a real-time authentication (RTA) system that performs voice biometric authentication. This may be performed via a RESTful web service. During interaction 1, a get context operation may be performed to determine interaction information via a connect API 204 and components for an interactions center 210. Further, interactions center 210 may cause a recorder 212 to begin recording and/or buffering of the audio for the voice communications, which may then be used for fraud detection and prevention using the processes and operations described herein. A process to collect and record consent from the customer and/or contact agent, if required by law, may be provided. An application server 208 may further be used to host and execute applications utilized during RTFP, RTA, call center voice communications, agent device computing services, and the like.

At an interaction 2, customer information is then sent through connect API 204 to interactions center 210, which may then resolve the customer information and identification parameters using a customer entity 206 that stores customer related data (e.g., customer specific data, past historical data, authentication data, and other data that may be secured and/or sensitive). Further at interaction 2, interactions center 210, after resolving the customer information, may forward the customer information to agent 202 via connect API 204. Once completed, at an interaction 3 services for RTFP, such as through voice biometric analysis, authentication, and fraud detection, may be initiated via the correspond calling device and service for agent 202. The device and/or computing service for agent 202 (e.g., a CRM device and service) may send the request via connect API 204 to interactions center 210.

Recorder 212 may then be requested to authenticate the customer or other end user and/or perform RTFP using voice prints from the buffered audio of the call. When requested to authenticate a customer and/or perform RTFP, recorder 212 may send the request for voice authentication and/or RTFP to a voice biometrics engine 214. Conventionally, voice biometrics engine 214 may merely perform voice authentication and/or RTFP by comparing the incoming buffered audio (e.g., through voice print conversion and generation via a voice biometric engine) to all fraudster voice prints existing in a database, such as database server 216. However, as described herein, voice biometrics engine 214 may instead utilize one or more of watchlists 218 that is progressively scaled to perform comparison to fraudster voice prints, as well as representative voice prints for fraudster voice print clusters, based on a number of the fraudster voice prints in one or more watchlists 218.

Thus, watchlists 218 stored in database server 216 may be used to determine whether one of the threshold number of fraudster voice prints have been met or exceeded to advance to additional stages where fraudster voice print clusters are generated, configured, and then later used for voice print comparison. For example, after a threshold number of fraudster voice prints in one or more of watchlists 218 may been met or exceeded, a learning and configuration phase may be executed to generate, cluster, re-cluster, and otherwise configure fraudster voice print clusters. Thereafter, once these clusters are deployed for one-to-few matching, voice prints from incoming buffered audio is compared to representative voice prints for all fraudster voice print clusters. The one-to-few voice print comparison, according to one or more highest scores, scores meeting or exceeding a threshold, or a combination thereof, proceeds with comparing the voice prints from incoming buffered audio to all fraudster voice prints in the identified one or more clusters. These processes and operations to perform the RTFP using this progressively scaled approach from one-to-many to one-to-few are discussed in further detail with regard to FIGS. 3A and 3B.

Figure 3A:
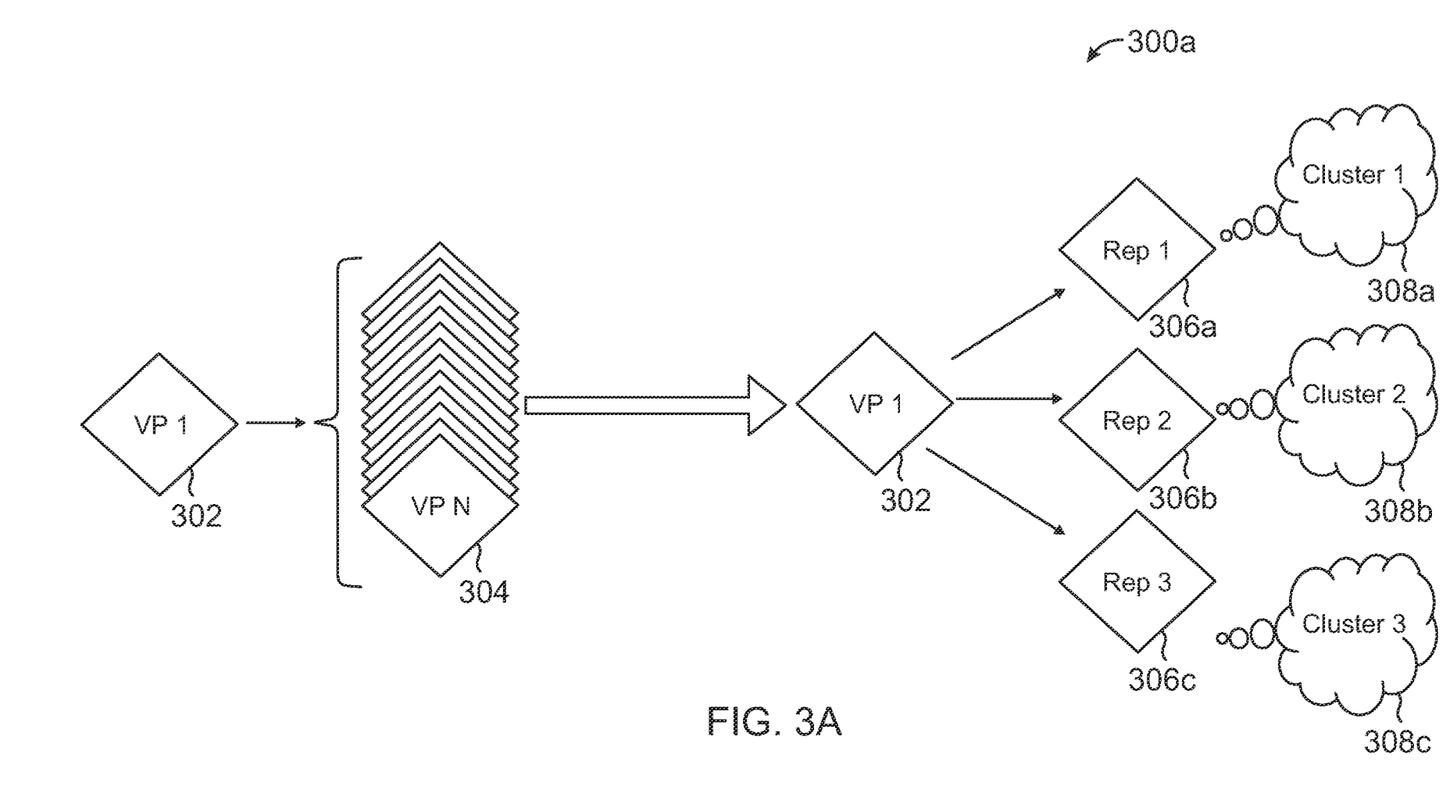
FIG. 3A is a simplified diagram of an exemplary process to perform one-to-few voice print comparison in place of one-to-many voice print comparison in a voice biometric authentication and fraud detection system according to some embodiments.

FIG. 3A is a simplified diagram of an exemplary process to perform one-to-few voice print comparison in place of one-to-many voice print comparison in a voice biometric authentication and fraud detection system according to some embodiments. Diagram 300a of FIG. 3A includes operations performed during voice biometric authentication and/or RTFP. For example, diagram 300a may be utilized by voice biometric application 130 discussed in reference to environment 100 of FIG. 1. The components of diagram 300a may be used during voice authentication and fraud detection through incoming voice print comparison with fraudster voice prints and/or fraudster voice print clusters from a watchlist. In this regard, diagram 300a displays conventional one-to-many voice print comparisons and one-to-few voice print comparisons discussed herein.

In diagram 300a, a voice print may be received during an authentication attempt and/or for RTFP based on incoming audio data, such as a voice sample taken from buffered audio during voice communications. On the left side, voice print 302 comparison and matching to fraudster voice prints 304 occurs conventionally in systems where voice print 302 from incoming audio is merely matched to N number of fraudster voice prints 304 that may exist in a fraudster voice print watchlist for a voice biometric authentication and fraud protection system. However, as the amount of fraudster voice prints 304 increases (e.g., as more fraudster voice prints are added), the additional comparison time incurs latency and processing time issues, thereby providing slower, and possibly not real-time or near real-time, fraud detection and prevention alerts and actions. Thus, conventional systems tend not to be optimized for large watchlists and/or high load systems.

To provide a one-to-few solution for RTFP in a voice biometric system, the right side of diagram 300a shows logic that may be used when comparing voice print 302 from incoming audio to clusters generated from fraudster voice prints 304. In this regard, representatives 306a, 306b, and 306c may correspond to representative voice prints for the subset of fraudster voice prints 304 in each of clusters 308a, 308b, and 308c. Representatives 306a-c may be represented as an average or calculated vector from the subset of fraudster voice prints 304 in each of clusters 308a-c. For example, clusters 308a-c may each include one or more of fraudster voice prints 304. When multiple voice prints are included in clusters 308a-c, an average or calculated representative of those voice prints may be required. Thus, representatives 306a-c may represent the selected ones of fraudster voice prints 304 in each of clusters 308a-c generated using a clustering algorithm or technique, such as k-means clustering. Although three representatives 306a-c and clusters 308a-c are shown, it is understood more or fewer may be generated and used based on voice print clustering.

Thereafter, voice print 302 may be compared to, and possibly matched based on similarity scores (e.g., vector comparison and similarity scores), to representatives 306a-c. If a highest score and/or score meeting or exceeding a threshold score is determined, such as if the highest score and/or score exceeding the threshold is for representative 306a, then a match may be detected. To limit the number of fraudster voice print comparisons, voice print 302 is then compared to the subset of fraudster voice prints 304 within that specific cluster, such as cluster 308a for representative 306a. This advantageously limits the number of voice print comparisons in a scalable manner as the number of fraudsters on a watchlist increases. For example, if cluster 308a (e.g., for representative 306a that was matched to voice print 302) includes ten fraudster voice prints, then ten individual fraudster voice print comparisons are needed. Including the comparison of voice print 302 to representatives 306a-c (three comparisons shown in diagram 300a), the total number of voice print comparisons is reduced to thirteen, which may provide faster voice biometric processing and be more efficient by reducing from N number of comparisons using fraudster voice prints 304 to thirteen.

Figure 3B:
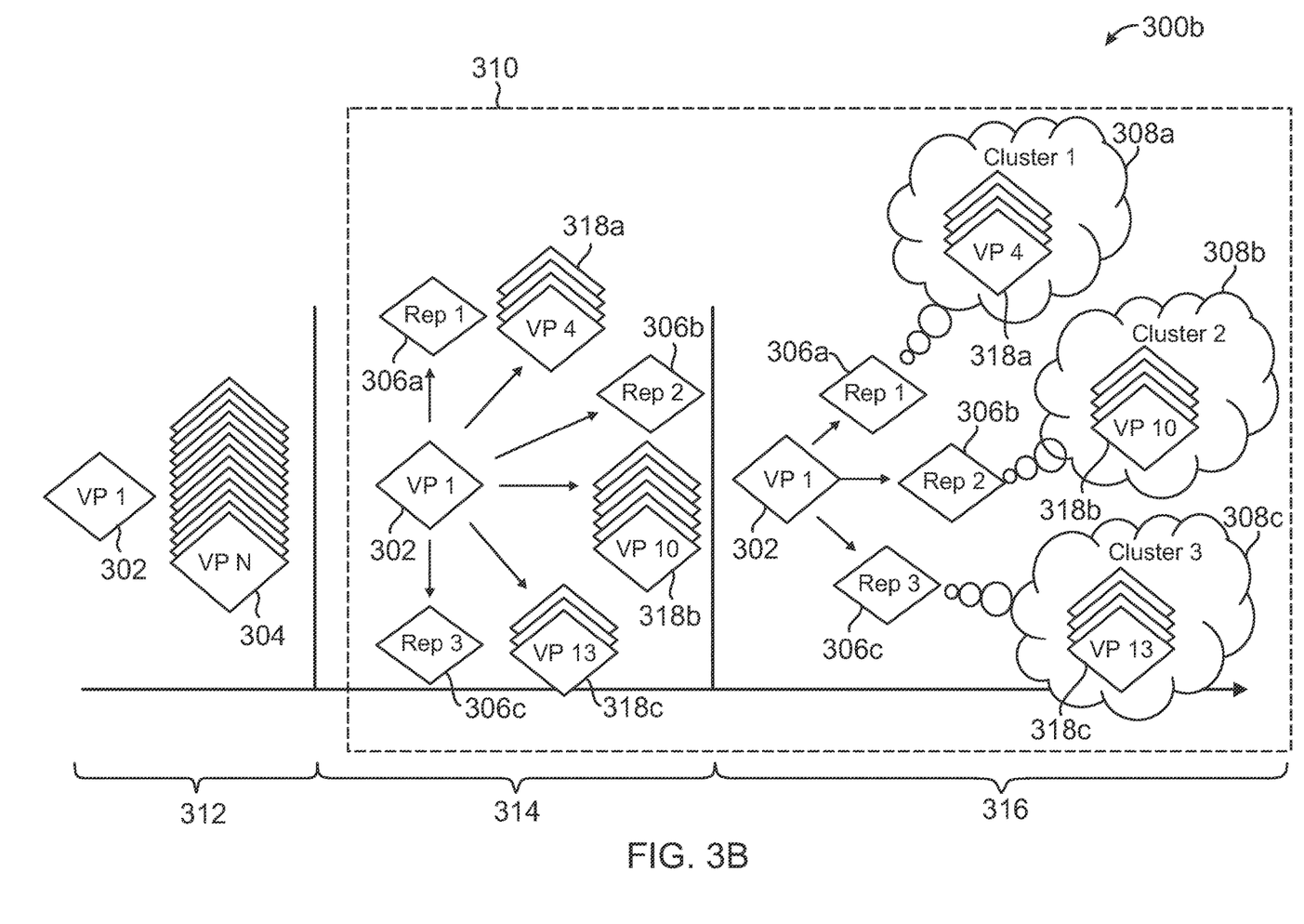
FIG. 3B is a simplified diagram of an exemplary process for progressively scaling to a one-to-few comparison system in a voice biometric authentication and fraud detection system according to some embodiments.

FIG. 3B is a simplified diagram of an exemplary process for progressively scaling to a one-to-few comparison system in a voice biometric authentication and fraud detection system according to some embodiments. Diagram 300b of FIG. 3B includes operations performed during voice biometric authentication and/or RTFP when progressively scaling a voice biometric system for one-to-few voice print comparisons. For example, diagram 300b may be utilized by voice biometric application 130 discussed in reference to environment 100 of FIG. 1 during voice authentication and fraud detection. In this regard, diagram 300b displays progressively scaling from a one-to-many voice print comparison system to a one-to-few voice print comparison system 310 discussed herein.

In diagram 300b, a first stage 312 of a progressively scaling system for voice biometric comparisons, authentication, and/or RTFP corresponds to a stage where one-to-many voice print comparisons may be performed. First stage 312 may be performed when a number, N, of fraudster voice prints 304 is at or below a first threshold, such as one hundred voice prints. First stage 312 may be performed while at or below this first threshold as the number N of fraudster voice prints 304 would not cause inordinate delay and/or prevent RTFP when comparing voice prints in a voice biometric authentication and fraud detection system. Thus, when incoming audio is converted to voice print 302, comparison of voice print 302 to all of fraudster voice prints 304 may occur in first stage 312.

Once the number N of fraudster voice prints 304 meets or exceeds the first threshold but is lower than a second, higher, threshold (e.g., one thousand voice prints), diagram 300b may proceed to implementing one-to-few voice print comparison system 310. In one-to-few voice print comparison system 310, a second stage 314 is executed as a learning phase that configures different voice print clusters, such as clusters 308a-c. Initially, a clustering algorithm and/or technique may be applied to fraudster voice prints 304 during second stage 314. This may utilize k-means clustering or other clustering algorithm that mathematically clusters voice prints according to their vector representation in N-dimensional space. Thus, during second stage 314, fraudster voice print subsets 318a, 318b, and 318c may be generated from fraudster voice prints 304. At second stage 314, although clusters 308a-c may be "determined" and representatives 306a-c may be generated, analysis may still be performed for all representatives, fraudster voice prints in each cluster, and clusters. This may include moving specific fraudster voice prints to a different cluster and/or changing configuration to use N-best representative comparisons and matching scores and not the first best score. Although three groupings for fraudster voice print subsets 318a-c are shown, it is understood that more, fewer, or different subsets may be generated according to the clustering algorithm.

In second stage 314, the RTFP of the voice biometric system may still be used in a production computing environment and for live call services, thereby provide live security and fraud protection. Since this may mean that security cannot be compromised (or may not be as easily compromised), the learning phase of second stage 314 may be utilized to verify that the generated clusters for fraudster voice print subsets 318a-c include expected fraudster voice prints and representatives 306a-c are properly created at the highest quality possible (e.g., clusters 308a-c include the correct fraudster voice prints in fraudster voice print subsets 318a-c so that representatives 306a-c properly represent the corresponding clusters). In this regard, it is expected that, during voice print comparison, the voice biometric system will receive a highest score or scores for a particular voice print from representatives 306a-c that represent a cluster in which a fraudster voice print is located that also has a highest score. If not, further tuning and configuration may be required, including moving voice prints between fraudster voice print subsets 318a-c, performing re-clustering including using a different clustering algorithm or technique, and/or electing to utilize N-best representative comparison.

Second stage 314 may be determined to be complete when the number of fraudster voice prints 304 meets or exceeds that second, higher, threshold, such as one thousand voice prints. However, system administrators and/or data scientists and/or IT security administrators may also extend or prematurely end second stage 314 based on satisfaction with clustering and/or other factors. Once the number N of fraudster voice prints 304 meets or exceeds the second threshold, diagram 300b may proceed to performing one-to-few voice print comparison system 310 in production. In one-to-few voice print comparison system 310, a third stage 316 performs the one-to-few voice print comparisons by utilizing representatives 306a-c for initial voice print matching with voice print 302, and then using the highest score, or N-highest when implemented, to determine one of clusters 308a-c for voice print matching. Thereafter, voice print comparison may occur between voice print 302 and one of fraudster voice print subsets 318a-c in the corresponding cluster that was matched to voice print 302. In some embodiments, a threshold score may also be required to prevent scenarios where the highest score may still not represent a good indication of fraud (e.g., is only a 25% match).

Thus, even after the voice biometric system is considered to be sufficiently trained from results received in second stage 314, third stage 316 may not analyze all of fraudster voice prints 304 for proper clustering of voice prints. Third stage 316 may begin to analyze clusters 308a-c specifically for which of representatives 306a-c have a highest similarity score with voice print 302. Second stage 314 may also continue and be configured according to organization security and business needs if further learning and configuration is required. When new fraudsters are detected, and their voice prints are added to the system, the learning flow in second stage 314 may be used to keep clusters 308a-c updated and maintain current representatives, and therefore representatives 306a-c may be updated and finely tuned even later.

Pseudo code and equations for performing the operations and processes described in reference to diagram 300b may be shown as follows in Equations 1. Although the first threshold is set at 100 voice prints for K and the second threshold is set at 1,000 voice prints for K, this is merely representative and different threshold may be selected.

Equations 1

Given a watchlist size K, where K represents a number of fraudster voice prints, If $1 \leq K \leq 100$:

Each incoming voice print from incoming audio is compared to K fraudster voice prints in the watchlist.

If $100 \leq K \leq 1000$:

Each incoming voice print (denoted as X) from incoming audio, it is compared to K fraudsters and J representatives.
During this stage:

if $I = \text{index}[\text{MAX}(\text{score}(X, K \text{ fraudsters}))]$

Then the similarity score of (X, representative[I])>score (X, representative[Y])|representative[Y]≠representative[I]
If Not—Adjust size of J and/or move I to a different cluster and/or use N-best representatives and not first best representative.

If $K \geq 1000$:

Each incoming voice print from incoming audio is compared to J representatives+|the subset of K fraudster voice prints in the most similar cluster|.

Figure 4:
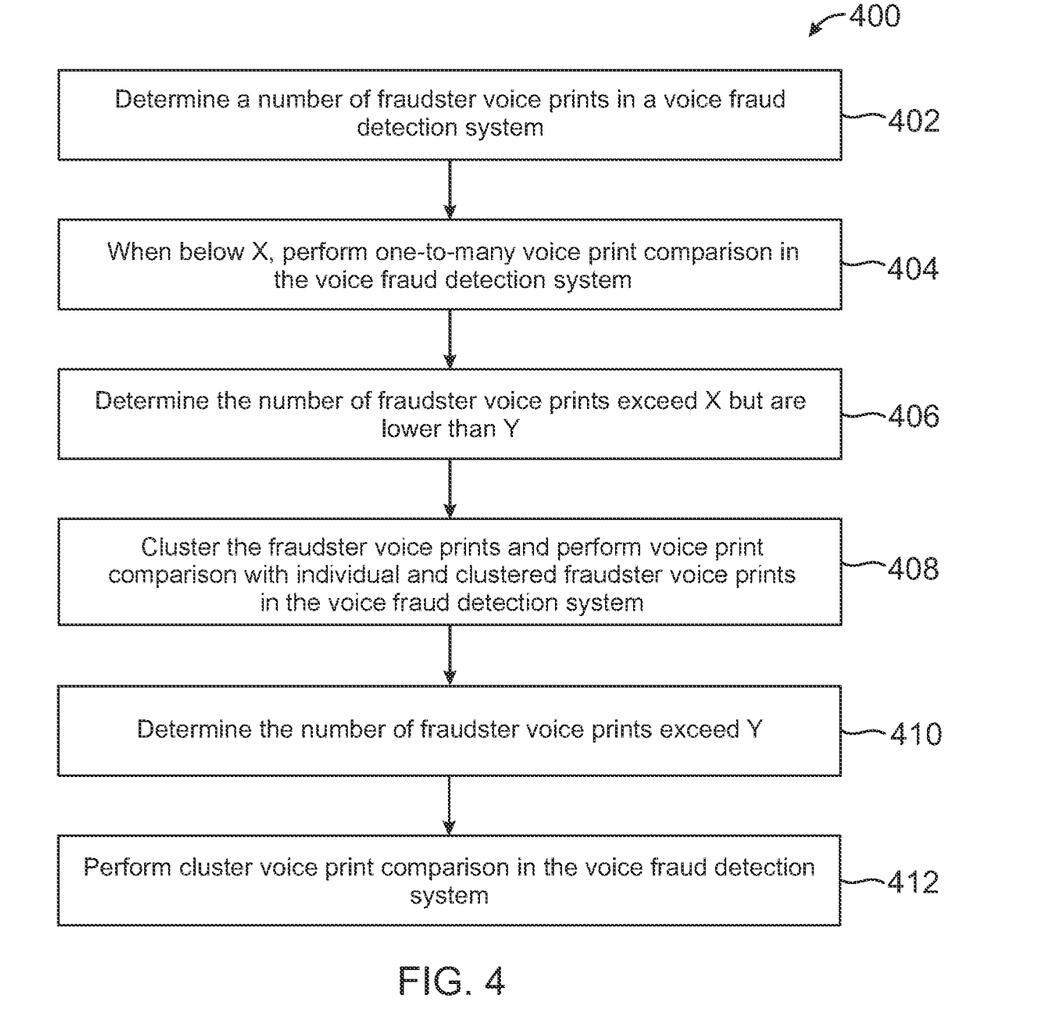
FIG. 4 is an exemplary flowchart for progressively scaling to a one-to-few comparison system in a voice biometric authentication and fraud detection system according to some embodiments.

FIG. 4 is an exemplary flowchart for progressively scaling to a one-to-few comparison system in a voice biometric authentication and fraud detection system according to some embodiments. In some embodiments, generation and utilization of a voice biometric authentication and fraud detection system described in method 400 of FIG. 4 can be implemented and performed using an online service provider system, such as service provider server 120. One or more of the processes 402-412 of method 400 may be implemented, at least in part, in the form of executable code stored on non-transitory, tangible, machine-readable media that when run by one or more processors may cause the one or more processors to perform one or more of the processes 402-412. In some embodiments, method 400 can be performed by one or more computing devices in environment 100 of FIG. 1.

At step 402 of method 400, a number of fraudster voice prints in a voice fraud detection system is determined. The number may correspond to individual fraudster voice prints for comparison to a received and/or generated voice print from incoming audio during a voice communication session. The fraudster voice prints may correspond to voice prints generated from audio of fraudsters during previous voice communication sessions that were deemed fraudulent or had a fraudster attempted to engage in malicious, illegal, or illicit activities. These activities may include attempting to discover sensitive or secure information or performing an account takeover with compromised account credentials.

At step 404, when below X, one-to-one voice print comparison is preferably performed in the voice fraud detection system. X may represent a lower threshold (and one which may be adjustable) that designates the maximum number of fraudster voice prints that may be in a watchlist prior to implementing one-to-few voice print comparison. Thus, for the received voice print, voice print comparisons are performed to all the fraudster voice prints in the voice print watchlist. However, the fraudster voice prints in the watchlist may continue to grow. At step 406, it is determined that the number of fraudster voice prints exceed X but are lower than Y. Y may represent a higher threshold than X, but where a learning and configuration phase may occur for voice print clustering and one-to-few voice print comparison. When this occurs, the one-to-few voice print comparison may begin to be trained using voice print clustering and representative generation for the clustered voice prints.

At step 408, the fraudster voice prints are clustered voice print comparison is performed with individual and clustered fraudster voice prints in the voice fraud detection system. Thus, at this stage, a learning and configuration phase may be executed to properly cluster the fraudster voice prints and configure the system for proper voice print comparison. Representatives of voice print clusters may be generated to compare received voice prints to voice print clusters, which may correspond to representative vectors for an average voice print or vector identified from the fraudster voice prints in each voice print cluster. During this phase, it may be expected that, when performing voice print comparison, a received voice print may be matched, based on a highest similarity score, to a representative for a cluster that further includes an individual fraudster voice print that also has a highest similarity score to the received voice print from all of the fraudster voice prints. If this does not occur, further tuning may be required by moving the fraudster voice print with the highest score to the cluster having the representative with the highest score, re-clustering the clusters, and/or utilizing N-best representatives to match multiple clusters, and therefore their fraudster voice prints, to the received voice print for voice print comparison.

At step 410, the number of fraudster voice prints are determined to exceed Y, the higher threshold. When this occurs, the voice biometric authentication and fraud detection system may implement the one-to-few voice print comparison system in order to provide RTFP by reducing the number of voice print comparisons needed, and therefore reducing lag and latency caused by high processing loads with many voice print comparisons. Thus, at step 412, cluster voice print comparison is performed in the voice fraud detection system. This may be performed by comparing a received voice print to all of the representatives for the voice print clusters that were determined, adjusted, and configured during the learning and configuration stage. Once a highest scored representative (or N-highest, as well as enforcing score threshold requirements) is determined, the received voice print is then compared to all of the fraudster voice prints in the matched cluster(s). A highest scored fraudster voice print (or N-highest) may then be identified, and the particular fraudster may be matched or associated with the received voice print. This then allows for alerting an agent or other user on a phone call with the potentially fraudulent user or entity that the call appears fraudulent and security measures should be enforced and/or executed. An alert or notification may be provided, which may further include options to execute security measures for ending the call, reporting or transferring the call to an administrator or authority, performing honeypot actions to ascertain additional information about the fraudster, and/or securing sensitive or confidential information.

As discussed above and further emphasized here, FIGS. 1, 2, 3A, 3B, and 4 are merely examples of service provider server 120 and corresponding methods for categorizing voice prints for encoding, compression, and voice authentication, which examples should not be used to unduly limit the scope of the claims. One of ordinary skill in the art would recognize many variations, alternatives, and modifications may be use in place of and/or in addition to the details disclosed herein.

Figure 5:
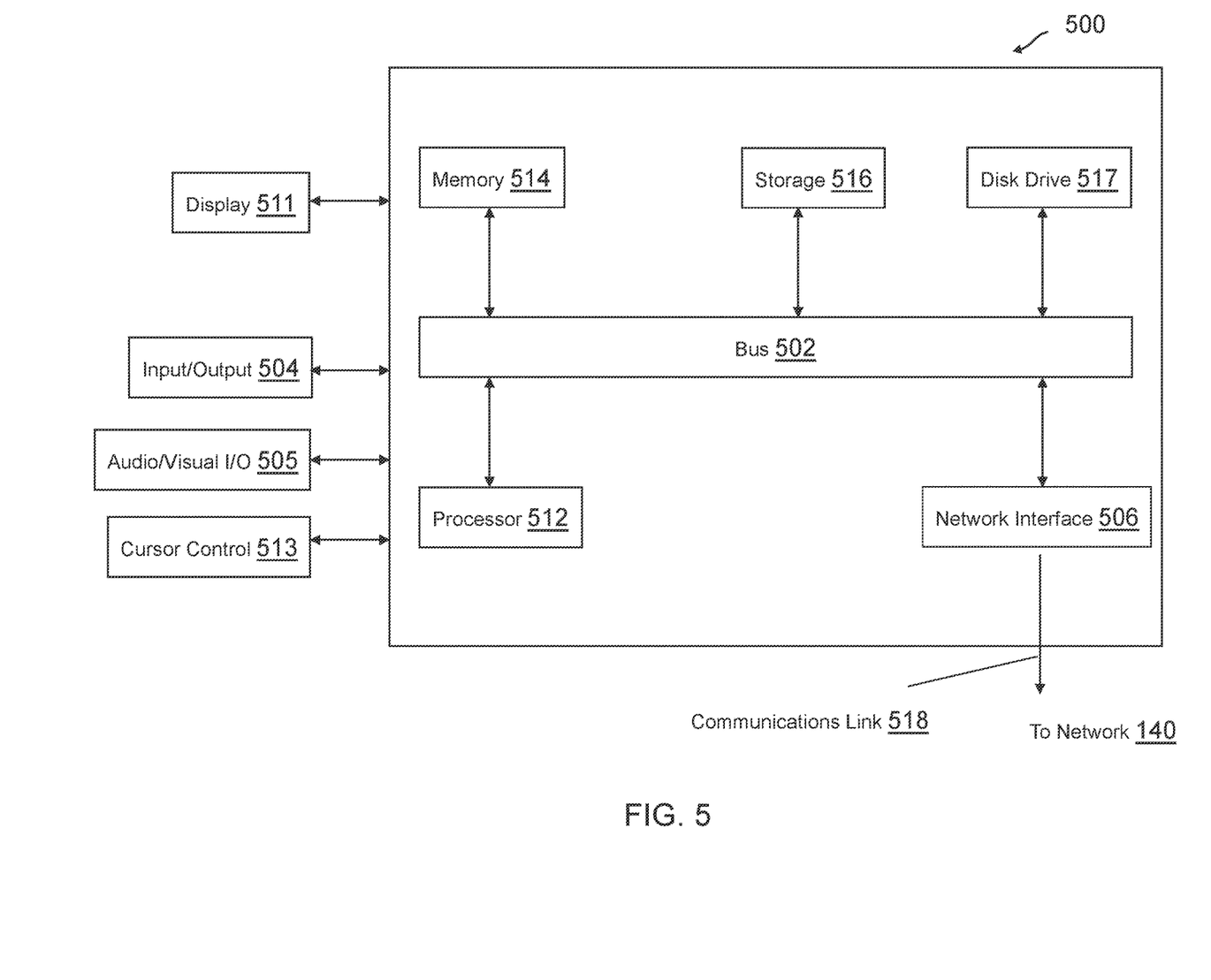
FIG. 5 is a simplified diagram of a computing device according to some embodiments.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output component 505 may also be included to allow a user to use voice for inputting information by converting audio signals. Audio/visual I/O component 505 may allow the user to hear audio, and well as input and/or output video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A voice biometric system for fraud prevention upscaling with a fraudster voice print watchlist, the voice biometric system comprising:
   a hardware processor and a non-transitory computer readable medium operably coupled thereto, the non-transitory computer readable medium comprising a plurality of instructions stored in association therewith that are accessible to, and executable by, the hardware processor, to perform fraud prevention operations which comprise:
   receiving a first voice print of a user during a voice authentication request;
   accessing the fraudster voice print watchlist comprising voice print representatives for a plurality of voice print clusters each having one or more of a plurality of voice prints identified as fraudulent for the voice biometric system;
   determining that one or more of the voice print representatives in the fraudster voice print watchlist meets or exceeds a first biometric threshold for risk detection of the first voice print during the fraud prevention operations;
   determining whether the first voice print matches a first one of the plurality of voice print clusters based on a first similarity score between the first voice print and a representative of the first one of the plurality of voice print clusters; and
   in response to determining that the first voice print matches the first one of the plurality of voice print clusters, determining that one of the plurality of voice prints in the first one of the plurality of voice print clusters matches the first voice print for the risk detection of the first voice print during the fraud prevention operations based on a second similarity score between the first voice print and the one of the plurality of voice print clusters.

2. The voice biometric system of claim 1, wherein the fraud prevention operations further comprise:
   generating an alert that the user is a potential fraudster based on the one of the plurality of voice prints matching the first voice print; and
   outputting the alert during the voice authentication request.

3. The voice biometric system of claim 1, wherein the fraud prevention operations further comprise:
   performing a re-clustering of the plurality of voice print clusters based on whether the first voice print is identified as a fraudster or a valid user.

4. The voice biometric system of claim 1, wherein, before receiving the voice authentication request, the fraud prevention operations further comprise:
   determining that a first number of the plurality of voice prints in the fraudster voice print watchlist is below or at a first scale of voice prints; and
   performing, when the first number of voice prints is below or at the first scale of voice prints, first voice authentications for the voice biometric system by matching first received voice prints to the plurality of voice prints in the fraudster voice print watchlist using similarity scores between the first received voice prints and the plurality of voice prints.

5. The voice biometric system of claim 4, wherein, before receiving the voice authentication request, the fraud prevention operations further comprise:
   determining that a second number of voice prints in the fraudster voice print watchlist meets or exceeds the first scale of voice prints but is below or at a second scale of voice prints; and
   generating the voice print representatives for the plurality of voice print clusters each having one or more of the plurality of voice prints using a clustering function.

6. The voice biometric system of claim 5, wherein, before receiving the voice authentication request, the fraud prevention operations further comprise:
performing, when the second number of voice prints meets or exceeds the first scale of voice prints but is below or at the second scale of voice prints, second voice authentications for the voice biometric system;
determining whether a voice print does not match the one of the plurality of voice prints within a corresponding one of the voice print representatives based on additional similarity scores between the voice print and the plurality of voice prints; and
performing a re-clustering operation for the plurality of voice print clusters represented by the voice print representatives using the clustering function.

7. The voice biometric system of claim 6, wherein, before receiving the voice authentication request, the fraud prevention operations further comprise:
determining that the first number of voice prints in the fraudster voice print watchlist meets or exceeds the second scale of voice prints; and
implementing the voice print representatives for the plurality of voice print clusters for the voice biometric system.

8. The voice biometric system of claim 6, wherein the performing the second voice authentication occurs synchronously with performing the re-clustering.

9. A method for fraud prevention upscaling with a fraudster voice print watchlist for a voice biometric system, which method comprises:
determining that a first number of a plurality of voice prints in the fraudster voice print watchlist is below or at a first scale of voice prints;
performing, when the first number of voice prints is below or at the first scale of voice prints, first voice authentications for the voice biometric system by matching first received voice prints to the plurality of voice prints in the fraudster voice print watchlist using similarity scores between the first received voice prints and the plurality of voice prints;
receiving a first voice print of a user during a voice authentication request;
accessing the fraudster voice print watchlist comprising voice print representatives for a plurality of voice print clusters each having one or more of the plurality of voice prints identified as fraudulent for the voice biometric system;
determining that one or more of the voice print representatives in the fraudster voice print watchlist meets or exceeds a first biometric threshold for risk detection of the first voice print during fraud prevention operations; and
determining whether the first voice print matches a first one of the plurality of voice print clusters based on a first similarity score between the first voice print and a representative of the first one of the plurality of voice print clusters.

10. The method of claim 9, wherein, if the first voice print matches the first one of the plurality of voice print clusters, the method further comprises:
determining that one of the plurality of voice prints in the first one of the plurality of voice print clusters matches the first voice print for the risk detection of the first voice print during the fraud prevention operations based on a second similarity score between the first voice print and the one of the plurality of voice print clusters.

11. The method of claim 10, further comprising:
generating an alert that the user is a potential fraudster based on the one of the plurality of voice prints matching the first voice print; and
outputting the alert during the voice authentication request.

12. The method of claim 10, further comprising:
performing a re-clustering of the plurality of voice print clusters based on whether the first voice print is identified as a fraudster or a valid user.

13. The method of claim 9, wherein, before receiving the voice authentication request, the method further comprises:
determining that a second number of voice prints in the fraudster voice print watchlist meets or exceeds the first scale of voice prints but is below or at a second scale of voice prints; and
generating the voice print representatives for the plurality of voice print clusters each having one or more of the plurality of voice prints using a clustering function.

14. The method of claim 13, wherein, before receiving the voice authentication request, the method further comprises:
performing, when the second number of voice prints meets or exceeds the first scale of voice prints but is below or at the second scale of voice prints, second voice authentications for the voice biometric system;
determining whether a voice print does not match the one of the plurality of voice prints within a corresponding one of the voice print representatives based on additional similarity scores between the voice print and the plurality of voice prints; and
performing a re-clustering operation for the plurality of voice print clusters represented by the voice print representatives using the clustering function.

15. The method of claim 14, wherein, before receiving the voice authentication request, the method further comprises:
determining that the first number of voice prints in the fraudster voice print watchlist meets or exceeds the second scale of voice prints; and
implementing the voice print representatives for the plurality of voice print clusters for the voice biometric system.

16. The method of claim 14, wherein the performing the second voice authentication occurs synchronously with performing the re-clustering.

17. A non-transitory computer-readable medium having stored thereon computer-readable instructions executable to cause fraud prevention upscaling with a fraudster voice print watchlist for a voice biometric system, which fraud prevention operations comprise:
determining that a first number of voice prints of a plurality of voice prints in the fraudster voice print watchlist meets or exceeds a first scale of voice prints but is below or at a second scale of voice prints;
generating voice print representatives for a plurality of voice print clusters each having one or more of the plurality of voice prints using a clustering function, wherein the voice print representatives are generated at least in part based on similarity scores between the one or more of the plurality of voice prints in each of the plurality of voice print clusters;
receiving a first voice print of a user during a voice authentication request;
accessing the fraudster voice print watchlist comprising voice print representatives for the plurality of voice print clusters each having one or more of the plurality of voice prints identified as fraudulent for the voice biometric system;

determining that one or more of the voice print representatives in the fraudster voice print watchlist meets or exceeds a first biometric threshold for risk detection of the first voice print during the fraud prevention operations; and determining whether the first voice print matches a first one of the plurality of voice print clusters based on a first similarity score between the first voice print and a representative of the first one of the plurality of voice print clusters from the voice print representatives.

18. The non-transitory computer-readable medium of claim 17, wherein, if the first voice print matches the first one of the plurality of voice print clusters, the fraud prevention operations further comprise:

determining that one of the plurality of voice prints in the first one of the plurality of voice print clusters matches the first voice print for the risk detection of the first voice print during the fraud prevention operations based on a second similarity score between the first voice print and the one of the plurality of voice print clusters.

\* \* \* \* \*